July 2, 1929.  T. GRISWOLD, JR  1,719,509
CHEMICAL APPARATUS FOR REACTIONS ON HEATED SOLID MATERIAL
Filed Feb. 1, 1927   4 Sheets-Sheet 1

INVENTOR.
Thomas Griswold Jr.
BY
Fay, Oberlin & Fay
ATTORNEYS

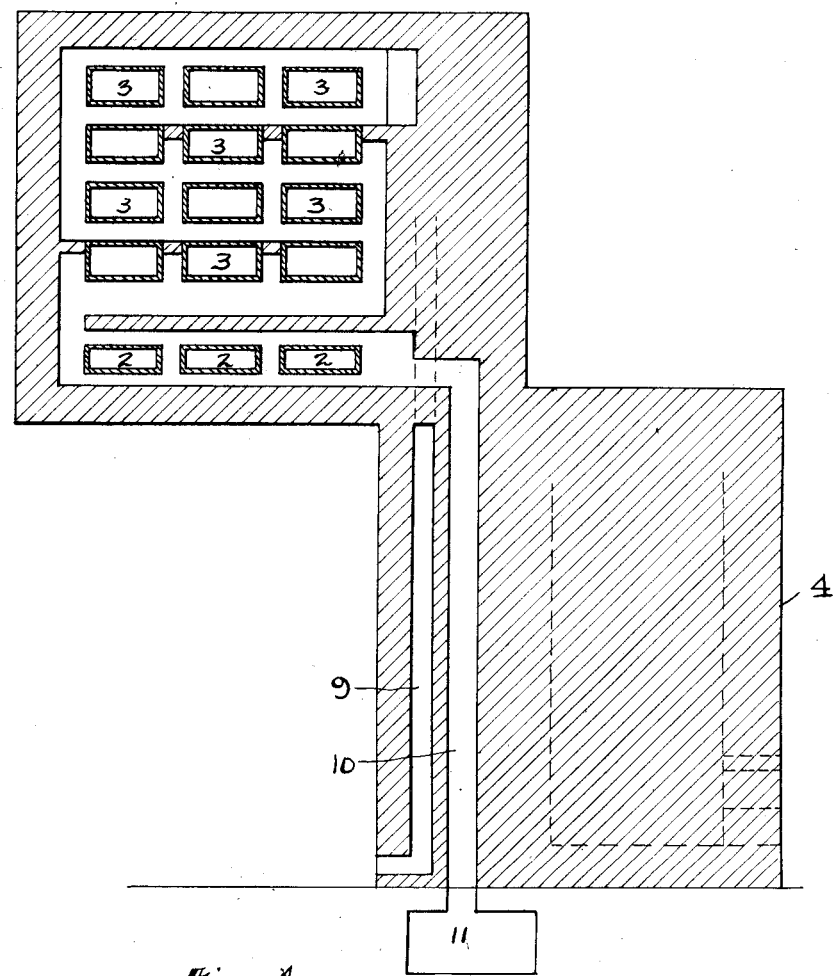

Patented July 2, 1929.

1,719,509

UNITED STATES PATENT OFFICE.

THOMAS GRISWOLD, JR., OF MIDLAND, MICHIGAN, ASSIGNOR TO THE DOW CHEMICAL COMPANY, OF MIDLAND, MICHIGAN, A CORPORATION OF MICHIGAN.

CHEMICAL APPARATUS FOR REACTIONS ON HEATED SOLID MATERIAL.

Application filed February 1, 1927. Serial No. 165,160.

This invention relates to apparatus for chemical reactions where there is a mass of solid material, and a gasiform substance, at elevated temperatures; and it is among the objects of the invention to provide for efficient supply of materials, and for removal of products. Other objects and advantages will appear as the description proceeds.

To the accomplishment of the foregoing and related ends, the invention, then, consists of the features hereinafter fully described, and particularly pointed out in the claims; the following description and the annexed drawings setting forth in detail certain features embodying the invention, the illustrative form shown, however, being but one of the various ways in which the principle of the invention may be applied.

In said annexed drawings:—

Figure 1:
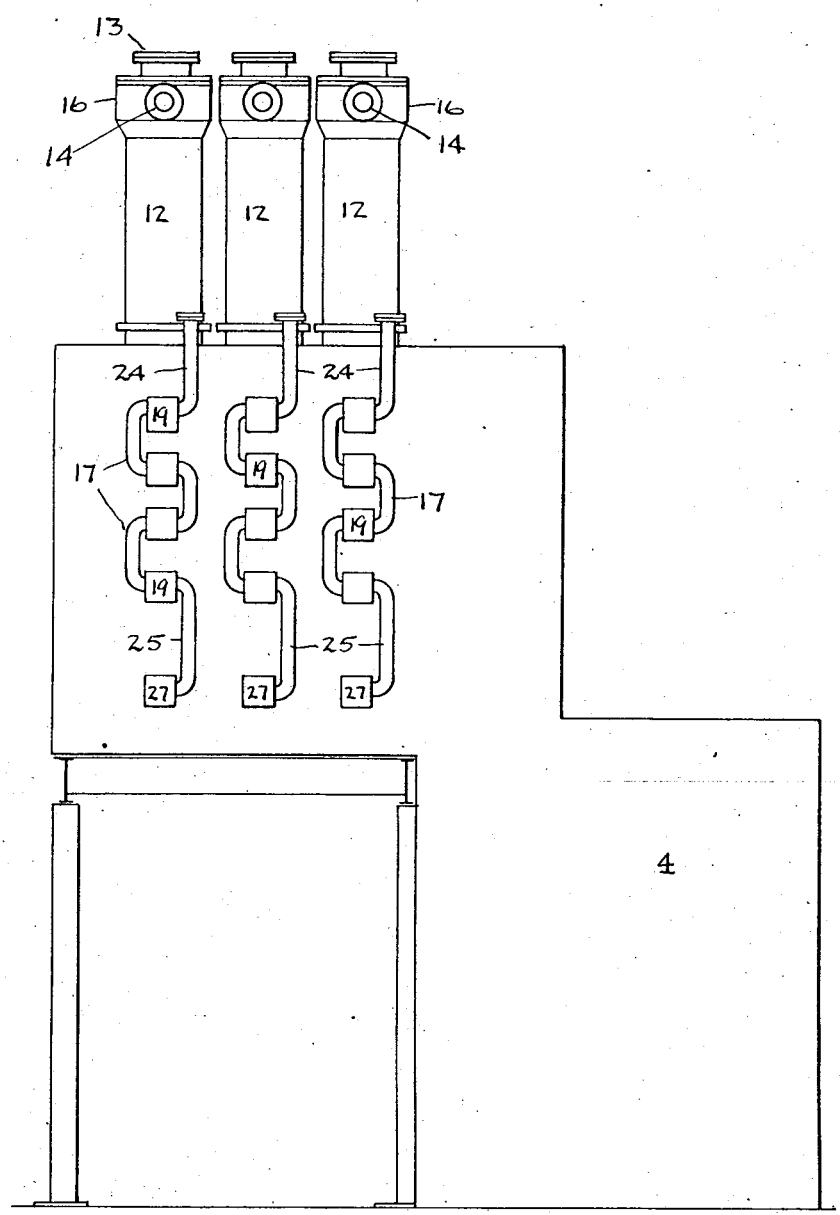
Figure 2:
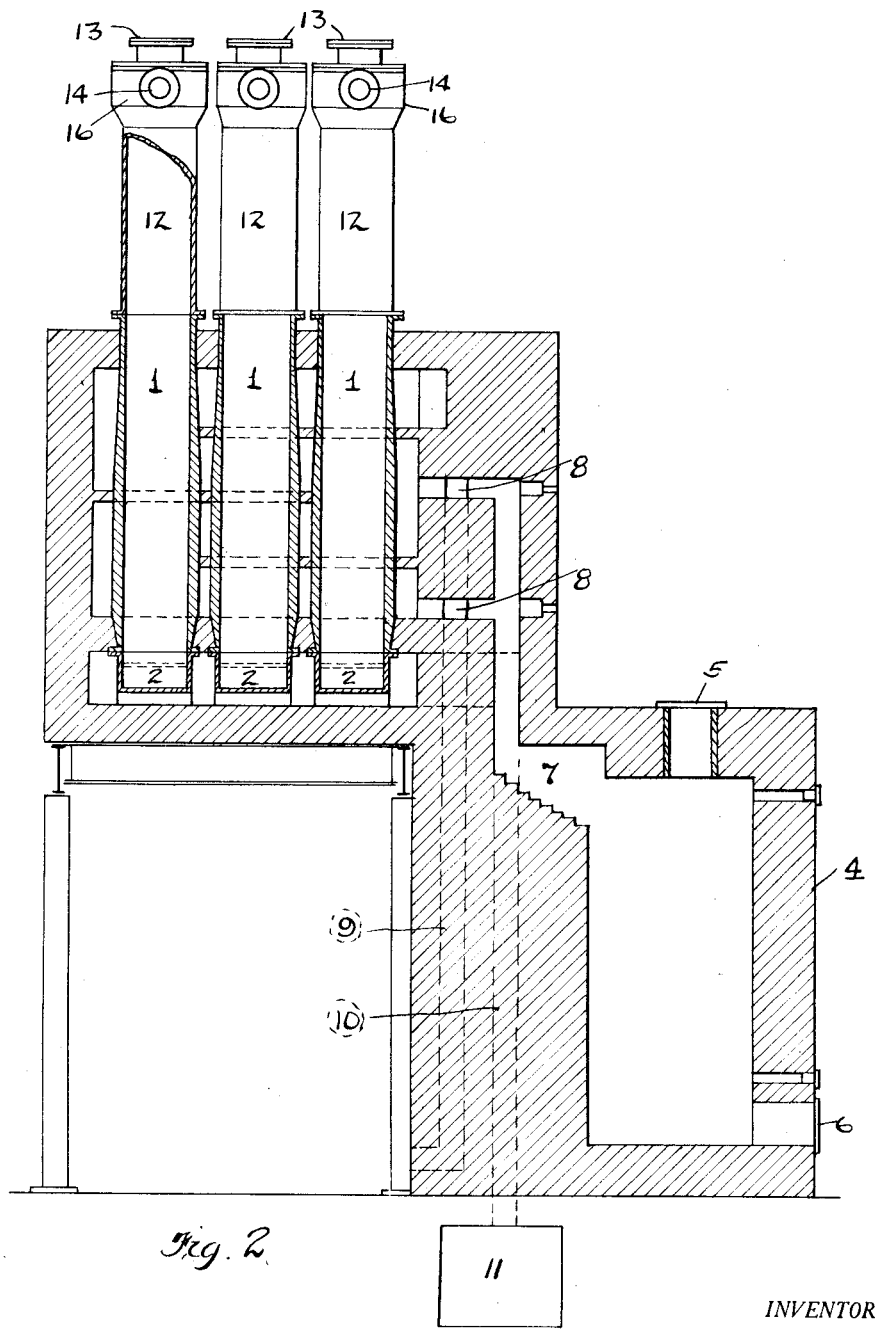
Figure 3:
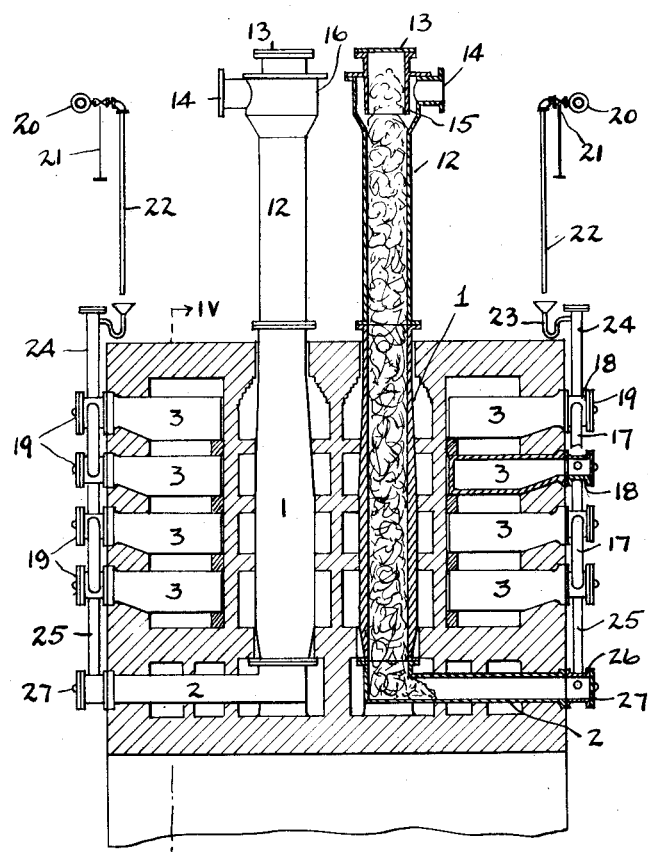

Fig. 1 is a side elevational view of an embodiment of the invention; Fig. 2 is a vertical sectional view; Fig. 3 is a section on a plane at right angles to Fig. 1; and Fig. 4 is a vertical section taken on a plane indicated approximately by line IV—IV, Fig. 3.

The reference character 1 in the drawing designates a reaction chamber adapted to contain heated solid material through which a gasiform substance is passed. Such reaction chambers are preferably of separable or movable character, and may be tubular, either of circular or elliptical or other cross section. Below each reaction chamber or retort 1, and if desired forming more or less of a support also therefor is a clean-out chamber or ash pot 2. For each retort or reaction chamber a vaporizing equipment in the form of a stack of vaporizing pots 3 is provided. The reaction chambers, clean-out chambers, and vaporizing pots are set in a setting in common having a flue system about the respective units, and supplied by a gas generator or producer 4 having a charging inlet 5 and clean-out 6. The gas producer by duct 7 communicates with the flue system, there being mixing ports 8 for air supplied by an inlet conduit 9. The air inlet is combined in a recuperator or regenerator heater with the outlet flue 10 for the waste flue gases on their way to the stack-flue 11.

Surmounting each reaction chamber 1 is a head 12 which may be extended to form a magazine for solid material, and which has a charging port 13 and an off-take 14 for gasiform products to a condenser or absorber system, not shown. A guard 15 in the form of a depending wall or skirt serves to insure adequate clearance at the upper portion of the head for free outlet of the gasiform products, and as a further assistance to this end, the head may be expanded as at 16 beyond the dimension of the lower portions.

The vaporizing equipment, as indicated, takes the form of a stack of vaporizing pots 3, and these are serially connected by conduits 17. These connections are located externally to the setting and are thus freely accessible for cleaning and repairs. Each pot 3 has a head 18 which may be separable or removable, and a closure plate 19 may be secured thereto by bolts or otherwise as convenient. The supply for the vaporizers comes from a line pipe 20, a controlling valve 21 and feed pipe 22 leading to a trap 23 on the inlet connection 24. From the lowermost member of the stack a connection 25 leads to a head 26 on the ash pot or clean-out chamber. A door 27 is provided on the latter. The retorts or reaction chambers, the clean-out chambers, and the vaporizing pots may be made of metal or of ceramic material, or some may be of one material and other of the elements may be of other material, ordinarily however, I prefer iron as the material, and particularly for the retorts, and it is desirable in some instances to strengthen or thicken the retort walls at the reaction zone.

In operation, the retorts are charged with the solid material to be used, and this may be of a catalytic or contact character for certain reactions or it may be of a reactant character as required. A gasiform substance supplied by the vaporizers is passed in through the lower chambers 2, and thence up into contact with the mass in the retorts, heated by the surrounding flues. In the case of carbon disulphide manufacture, and the present apparatus is particularly well adapted therefor, the retorts are charged with carbon, usually in the form of charcoal, and sulphur melted, for example by a steam heated melter, not shown, is forwarded through pipe 20 and the feed is regulated by a valve 21 to the requirements, the molten sulphur passing down through the trap 23 and into the upper pot 3. Vaporization and progressive heating occurs from pot to pot down the stack in the series and the heater vapor, even carrying more or less superheat if desired, proceeds through the lower chamber 2 to the carbon mass in the retorts.

Carbon disulphide produced is taken off at the off-takes to the condensers.

By reason of the flue system and conjoined direct gas supply, the heat of the consolidated setting may be provided with a minimum external loss, and control is correspondingly made more certain.

Other modes of applying the principle of the invention may be employed, change being made as regards the details disclosed, provided the means stated in any of the following claims, or the equivalent of such, be employed.

I therefore particularly point out and distinctly claim as my invention:—

1. In an apparatus of the character described, the combination of a separable reaction chamber, and a metallic vaporizing pot mounted in a common setting in a position incapable of receiving refuse from the reaction chamber.

2. In apparatus of the character described, the combination of a vertical tubular separable reaction chamber above a clean-out chamber connected with a series of vaporizing pots all set in a system of heating flues.

3. In apparatus of the character described, the combination of a reaction chamber above a clean-out chamber, a magazine on said reaction chamber, a series of connected vaporizing pots, and a duct connecting said vaporizing pots with said clean-out chamber.

4. In apparatus of the character described, the combination of a reaction chamber, and a connected stack of vaporizing pots mounted in a common setting.

5. In apparatus of the character described, the combination of a reaction chamber, a stack of vaporizing pots mounted in a common setting, and ducts connecting said pots serially.

6. In apparatus of the character described, the combination of a reaction chamber, a stack of vaporizing pots mounted in a common setting, and ducts accessible outside the setting connecting said pots serially.

7. In apparatus of the character described, the combination of a reaction chamber, an ash pot thereunder, a connected stack of metal vaporizing pots, and a flue system about said chamber and ash pot and vaporizing pots.

8. In apparatus of the character described, the combination of a plurality of reaction chambers, an ash pot under each chamber, a plurality of connected stacks of vaporizing pots, and heating flues about said chambers, said ash pots and said vaporizing pots.

9. In apparatus of the character described, the combination of a plurality of reaction chambers, an ash pot under each chamber, a plurality of connected stacks of vaporizing pots, ducts connecting each stack of vaporizing pots to the ash pot, and heating flues about said chambers, said ash pots and said vaporizing pots.

10. In apparatus of the character described, the combination of a plurality of reaction chambers, an ash pot under each chamber, a plurality of stacks of vaporizing pots, ducts accessible externally connecting each stack of vaporizing pots to the ash pot, and heating flues about said chambers, said ash pots and said vaporizing pots.

Signed by me this 24th day of January, 1927.

THOMAS GRISWOLD, Jr.